| United States Patent [19] | [11] 4,011,381 |
|---|---|
| Iwasawa et al. | [45] Mar. 8, 1977 |

[54] PROCESS FOR PREPARING THERMOSETTING POWDER COATING COMPOSITION

[75] Inventors: Naozumi Iwasawa; Nobuo Sugiyama; Ichiro Yoshihara; Tadashi Watanabe; Taizo Kondo, all of Hiratsuka, Japan

[73] Assignee: Kansai Paint Company, Ltd., Amagasaki, Japan

[22] Filed: May 28, 1975

[21] Appl. No.: 581,430

[30] Foreign Application Priority Data

June 4, 1974 Japan .................. 49-63218

[52] U.S. Cl. .................. 526/56; 260/42.29; 428/500; 526/16; 526/89; 526/208; 526/209; 526/216; 526/273
[51] Int. Cl.$^2$ .................. C08F 220/14
[58] Field of Search .................. 260/861 R, 80.72; 526/16, 56, 273

[56] References Cited

UNITED STATES PATENTS

| 3,323,946 | 6/1967 | Ravve et al. | 260/80.72 |
| 3,843,594 | 10/1974 | LaBana et al. | 260/80.72 |
| 3,876,587 | 4/1975 | Matsui et al. | 260/80.72 |

Primary Examiner—Harry Wong, Jr.
Attorney, Agent, or Firm—Larson, Taylor and Hinds

[57] ABSTRACT

A process for preparing a thermosetting powder coating composition comprising the steps of copolymerizing 5 to 25 wt.% of at least one of glycidyl acrylate and glycidyl methacrylate with 95 to 75 wt.% of an ethylenically unsaturated compound in a solvent having a boiling point of up to 170° C to obtain a solution of copolymer, the copolymer having a number average molecular weight of 2,000 to 30,000 and a melt viscosity of 100 to 500 poises at 160° C, uniformly dispersing a pigment into the copolymer solution, removing the solvent from the resulting mixture at a temperature of 170° to 220° C and reduced pressure, thereafter admixing a di- or tri-carboxylic acid cross-linking agent with the mixture with heating at a temperature of up to 120° C, and pulverizing the solid mixture obtained.

15 Claims, No Drawings

PROCESS FOR PREPARING THERMOSETTING POWDER COATING COMPOSITION

This invention relates to a process for preparing thermosetting powder coating compositions.

Powder coating compositions are usually prepared by melting powder resin and pigment together by heating roll mill or extruder to obtain a uniform mixture, pulverizing the mixture and admixing a cross-linking agent with the resulting powder with heating at a temperature of up to 120° C. However, this method is much lower in productivity and requires longer time for color matching than is the case with solvent-type coating compositions. Moreover, preparation of a powder coating composition of the desired color needs skilled labor. These are difficulties encountered in ensuring stable availability of powder coating compositions in large quantities.

To overcome the drawbacks of the conventional method, it is desirable to prepare powder coating compositions from solvent-type coating compositions. In fact, a method for preparing a powder coating composition from a solvent-type coating composition is known in which an alcohol solution of di- or tri-carboxylic acid cross-linking agent and pigment are mixed with a solution of copolymer of an ethylenically unsaturated compound with at least one of glycidyl acrylate and glycidyl methacrylate and the solvent is removed from the resulting mixture. Although this method is almost free of the difficulties heretofore experienced in preparing powder coating compositions from powdery resins, the method involves other drawbacks as will be described below. First, because the solvent is removed from the mixture of copolymer solution, alcohol solution of di- or tri-carboxylic acid cross-linking agent and pigment, the solvent must be removed at a low temperature of usually not higher than 100° C so as to preclude the reaction between the copolymer and the cross-linking agent. Consequently, it is almost impossible to reduce the amount of residual solvent to a level of less than 0.5 wt. % as desired for powder coating compositions. For example, even if the mixture is heated for 20 hours, the amount of the residual solvent can not be reduced to a level of less than 0.5 wt. %. Second, most of the copolymers usable are not soluble in alcohol per se in which the cross-linking agent is dissolved, so that a solvent in which the copolymer is soluble must be used conjointly with alcohol. Use of the additional solvent necessitates a further procedure for the recovery and reuse of the solvent and is therefore economically disadvantageous.

An object of this invention is to provide a process for preparing a powder coating composition in which the solvent is removable so that the amount of residual solvent will not exceed 0.5 wt. %, without permitting the reaction between the copolymer and the cross-linking agent to any extent.

Another object of this invention is to provide a process for preparing a powder coating composition using a single solvent.

Other objects of this invention will become apparent from the following description.

Our researchers have revealed the following:

1. Conventionally, the step of removing the solvent from the solution of copolymer of ethylenically unsaturated compound and at least one of glycidyl acrylate and glycidyl methacrylate must be carried out at a temperature of less than 150° C to inhibit the reaction between the glycidyl groups contained in the copolymer. At this low temperature, removal of the solvent attainable is such that the amount of residual solvent is about 0.8 wt. %, if lowest. Accordingly, the method involving the step of removing the solvent from a copolymer solution is generally considered to be unapplicable to the preparation of powder coating compositions. As a result of intensive researches, however, we found that a specific copolymer is satisfactorily serviceable which copolymer is prepared by copolymerizing 5 to 25 wt. % of at least one of glycidyl acrylate and glycidyl methacrylate with 95 to 75 wt. % of ethylenically unsaturated compound, the copolymer having a number average molecular weight of 2,000 to 30,000 and a melt viscosity of 100 to 500 poises at 160° C. More specifically, when a pigment or pigments are dispersed into a solution of the copolymer and the solvent is thereafter removed from the mixture at a temperature of 170° to 220° C under reduced pressure, we found that the solvent is easily removable to such extent that the amount of residual solvent is not higher than 0.5 wt. % without permitting the reaction between the glycidyl groups.

2. Accordingly, we further found that a powder coating composition can be prepared by removing the solvent from the mixture of copolymer solution and pigment in the above-mentioned manner and admixing a powdery cross-linking agent with the resulting solid mixture, without entailing the troublesome problem of reaction between the cross-linking agent and the copolymer heretofore experienced.

The present invention, accomplished based on the foregoing novel findings, provides a process for preparing a powder coating composition comprising the steps of copolymerizing 5 to 25 wt. % of at least one of glycidyl acrylate and glycidyl methacrylate with 95 to 75 wt. % of an ethylenically unsaturated compound in a solvent having a boiling point of up to 170° C to obtain a solution of copolymer, the copolymer having a number average molecular weight of 2,000 to 30,000 and a melt viscosity of 100 to 500 poises at 160° C, uniformly dispersing a pigment into the copolymer solution, removing the solvent from the resulting mixture at a temperature of 170° to 220° C under reduced pressure to produce a powdery mixture, thereafter admixing a di- or tri-carboxylic acid cross-linking agent of powdery state with the resultant powdery mixture with heating at a temperature of up to 120° C, and pulverizing the solid mixture obtained.

According to this invention, 5 to 25 wt. % of at least one of glycidyl acrylate and glycidyl methacrylate and 95 to 75 wt. % of ethylenically unsaturated compound are copolymerized by usual solution polymerization method in the presence of a radical polymerization initiator in an atmosphere of air or inert gas. The amount of the glycidyl acrylate and/or glycidyl methacrylate used for copolymerization is 5 to 25 wt. %, preferably 10 to 23 wt. %. Below 5 wt. %, the coating film obtained has poor properties, especially in respect of resistance to solvents, acids and alkalis, whereas above 25 wt. %, the resulting coating film is poor in gloss and surface smoothness. Useful ethylenically unsaturated compounds are versatile and include those copolymerizable with the glycidyl acrylate and/or glycidyl methacrylate. Examples are acrylates and methacrylates represented by the formula

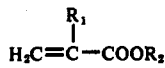

wherein $R_1$ is hydrogen atom or $-CH_3$ and $R_2$ is alkyl having a carbon number of 1 to 12, cyclohexyl or

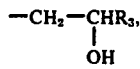

$R_3$ being hydrogen atom or $-CH_3$. More specific examples are methyl methacrylate, ethyl methacrylate, butyl methacrylate, methyl acrylate, ethyl acrylate, butyl acrylate, 2-ethylhexyl acrylate, 2-hydroxyethyl methacrylate, 2-hydroxypropyl methacrylate, 2-hydroxypropyl acrylate, lauryl methacrylate, cyclohexyl methacrylate and cyclohexyl acrylate. Also usable are styrene, α-methylstyrene, vinyltoluene, methacrylonitrile and acrylonitrile. Usable as radical polymerization initiators are those generally known, such as benzoyl peroxide, lauroyl peroxide, tert-butylhydroperoxide, tert-butylperoxy benzoate, acetylcyclohexanesulfonyl peroxide, isobutyroyl peroxide, di-(2-ethylhexyl) peroxydicarboxylate, diisopropyl peroxydicarboxylate, tert-butyl peroxypivalate, decanoyl peroxide, azobisisovaleronitrile, azobisisobutyronitrile, etc.

Useful solvents are those boiling at temperatures not higher than 170° C, preferably at 70° to 160° C. With a boiling point of higher than 170° C, the solvent takes a prolonged period of time for removal in the subsequent step in which the amount of residual solvent is to be reduced to not higher than 0.5 wt. %. Difficulties are also encountered in reducing the amount of residual solvent to the specified level. Examples of solvents are toluene, xylene, ethyl acetate, butyl acetate, ethylene glycol monoethyl ether, ethylene glycol monomethyl ether, ethylene glycol monoethyl acetate, ethylene glycol monomethyl ether acetate, methyl ethyl ketone, methyl butyl ketone, methyl isobutyl ketone, benzene, etc.

Solution polymerization method is carried out under usual conditions, generally at a temperature of 70° to 160° C for 3 to 12 hours.

According to this invention, it is critical that the copolymer resulting from the polymerization reaction have a number average molecular weight of 2,000 to 30,000, preferably 2,500 to 20,000 and a melt viscosity of 100 to 500 poises, preferably 100 to 400 poises, at 160° C. If the number average molecular weight is less than 2,000, the resistance to "blocking" of the powder coating composition obtained becomes poor. The term "blocking" means that particles in the coating composition cohere one another during storage. Whereas in excess of 30,000, the resulting coating film is poor in gloss and surface smoothness. Further if the melt viscosity at 160° C is lower than 100 poises, the powder coating composition obtained will exhibit poor resistance to blocking. On the other hand, in excess of 500 poises, the subsequent solvent removing step involves difficulties in sufficiently removing the solvent and takes a longer period of time.

A pigment or pigments are then added to the copolymer solution obtained. The pigments to be used include coloring pigment and extender pigment. Examples of the coloring pigment are titanium dioxide, lead white, lithopone, zinc white, red iron oxide, red lead, vermillion, cadmium red, molybdenum red, cuprous oxide, chrome yellow, zinc chromate, chrome green, Irgazin Yellow 3RLT (trade mark, J. R. Geigy S.A., Switzerland), Toluidine Red, copper-Phthalocyanine Blue, copper-Phthalocyanine Green, etc. Examples of the extender pigment are calcium carbonate, talc, clay, etc. The amount of the pigment used is suitably determined in accordance with the color desired. Along with pigments, various other additives usually incorporated in powder coating compositions may be added to the copolymer solution as desired. Examples of such additives are a leveling agent, antistatic agent, etc. To facilitate dispersion of pigments and other additives, solvent may be additionally used. Furthermore it is possible to admix a copolymer solution containing a pigment or pigments and having a different color with the above-mentioned copolymer solution for color matching.

Subsequently, the solvent is removed from the resulting mixture by placing the mixture into a container equipped with a stirrer, concurrent condenser and pressure reducing means and heating the contents at a temperature of 170° to 220° C, preferably 175° to 210° C, under reduced pressure. If the temperature is below 170° C, it is impossible to reduce the amount of residual solvent to a level of less than 0.5 wt. % even under reduced pressure, whereas temperatures higher than 220° C are objectionable since the glycidyl groups in the copolymer tend to react with each other. Further even at a temperature of 170 to 220° C, the operation must be conducted at reduced pressure; otherwise, e.g. at atmospheric pressure, it is impossible to sufficiently remove the solvent. The pressure employed is less than about 70 mmHg, preferably less than about 40 mmHg. With this invention, it is preferable to preheat the mixture to 170° C at atmospheric pressure and then subject the mixture to the step of removing the solvent at the specified temperature under reduced pressure.

Removal of the solvent gives a solid mixture, which is placed, together with di- or tri-carboxylic acid cross-linking agent, into a usual heating-type mixer, in which they are uniformly mixed together with kneading while being heated at a temperature of up to 120° C, preferably 70° to 110° C. Effectively usable as the di-or tri-carboxylic acid cross-linking agent is any of conventional agents such, for example, as phthalic anhydride, tetrahydrophthalic anhydride, hexahydrophthalic anhydride, isophthalic acid, adipic acid, succinic acid, maleic acid, fumaric acid, dodecanedicarboxylic acid, azelaic acid, suberic acid, sebacic acid, pyromellitic acid, trimellitic anhydride, etc. The cross-linking agent may be used in such amount that the molar ratio of the glycidyl groups in the copolymer to the carboxyl groups in the cross-linking agent (i.e. glycidyl/carboxyl ratio) is 1.6 to 0.8, preferably 1.2 to 0.9. If the proportion of the cross-linking agent is below the above range, the resulting powder coating composition applied in the form of a coating tends to fail to cure satisfactorily, whereas at higher ratios than the above, the copolymer tends to undergo curing when mixed with the cross-linking agent. The heating-type mixer may be any of known mixers adapted for heating, examples being a heating kneader, extruder, etc. Mixing at temperatures higher than 120° C is objectionable since the copolymer tends to react with the cross-linking agent. When desired, the substantially solvent-free solid mixture and the cross-linking agent are mixed together in the presence of a catalyst such as dibutyltin laurate or triphenyltin chloride or like organotin compound, or trimethylbenzylammonium chloride, tetraethylammonium bromide or like quaternary amine salt. In order to react the copolymer with the cross-linking agent, the catalyst is generally used in an amount of about 0.1 to 5 wt. %, preferably about 0.1 to 3 wt. %, based on the copolymer.

The uniform mixture obtained is then pulverized usually to particle sizes of up to about 100μ, whereby the desired powder coating composition is obtained.

Since pigments and other additives are admixed with and dispersed in the copolymer solution according to this invention, a ball mill or sand mill is employable which is suitable for a large-scale operation as is the case with usual solvent-type coating compositions. Furthermore color matching, which can be done in the same manner as in solvent-type compositions, is carried out as readily as is the case with the latter. Because the solvent is removable at reduced pressure and at a high temperature of 170° to 220° C with stirring, the present process has another advantage that the removal of solvent can be effected within a greatly reduced period of time, employing an ordinary reactor equipped with a concurrent condenser. Thus the process is feasible on a large scale for production in large quantities.

Given below are Reference Examples for the preparation of copolymers, Examples of the process of this invention and Comparison Examples to clarify the features of the invention. Throughout these Reference Examples, Examples and Comparison Examples, the parts and percentages are all by weight.

REFERENCE EXAMPLE 1

A 3% quantity of 2,2'-azobisisobutyronitrile (hereinafter referred to as AIBN) serving as a catalyst is dissolved in a monomer mixture of 15% of glycidyl methacrylate, 20% of styrene, 45% of methyl methacrylate and 20% of butyl acrylate. Over a period of 2 hours, 100 parts of the resulting mixture is added dropwise to 100 parts of toluene under reflux in nitrogen atmosphere with vigorous stirring. The reactor is equipped with a condenser to reflux the toluene. The reaction system is maintained at a refluxing temperature of 109° to 112° C. After the completion of addition of the monomer mixture, the reaction system is held under reflux for further 3 hours. The reaction gives 50% solution of a solid copolymer in toluene. The copolymer has a number average molecular weight (Mn) of 8,000 and a melt viscosity of 165 poises at 160° C.

REFERENCE EXAMPLE 2

The procedure of Reference Example 1 is repeated except that a copolymer is prepared from a monomer mixture of 8% of glycidyl methacrylate, 30% of methyl methacrylate, 10% of styrene, 40% of butyl methacrylate and 12% of 2-hydroxyethyl methacrylate, using 3% of azobisisovaleronitrile (hereinafter referred to as ABVN) as a catalyst and benzene as a solvent. The copolymer has a number average molecular weight of 16,000 and a melt viscosity of 205 poises at 160° C.

REFERENCE EXAMPLE 3

The procedure of Reference Example 1 is repeated except that a copolymer is prepared from a monomer mixture of 12% of glycidyl methacrylate, 48% of methyl methacrylate, 20% of styrene and 20% of butyl acrylate, using 5% of a catalyst (AIBN) and toluene as a solvent. The copolymer has a number average molecular weight of 4,000 and a melt viscosity of 130 poises at 160° C.

REFERENCE EXAMPLE 4

A monomer mixture is prepared from 20% of glycidyl methacrylate, 40% of methyl methacrylate, 20% of 2-ethylhexyl acrylate and 20% of styrene. A copolymer is prepared from the monomer mixture in the same manner as in Reference Example 1 except that 1% of benzoyl peroxide is used as a catalyst and that xylene is used as a solvent for the copolymer. The copolymer obtained has a number average molecular weight of 13,000 and a melt viscosity of 245 poises at 160° C.

REFERENCE EXAMPLE 5

The procedure of Reference Example 1 is repeated except that a copolymer is prepared from a monomer mixture of 20% of glycidyl methacrylate, 45% of methyl methacrylate and 35% of butyl methacrylate, using 6% of a catalyst (ABVN) and toluene as a solvent. The copolymer has a number average molecular weight of 3,000 and a melt viscosity of 115 poisies at 160° C.

REFERENCE EXAMPLE 6

The procedure of Reference Example 1 is repeated except that a copolymer is prepared from a monomer mixture of 15% of glycidyl methacrylate, 35% of methyl methacrylate, 30% of styrene and 20% of butyl acrylate, using 4% of a catalyst (AIBN) and toluene as a solvent. The copolymer has a number average molecular weight of 6,000 and a melt viscosity of 145 poises at 160° C.

REFERENCE EXAMPLE 7

The procedure of Reference Example 1 is repeated except that a copolymer is prepared from a monomer mixture of 15% of glycidyl methacrylate, 40% of methyl methacrylate, 35% of styrene and 10% of lauryl methacrylate, using 4% of a catalyst (AIBN) and toluene as a solvent. The copolymer has a number average molecular weight of 6,000 and a melt viscosity of 370 poises at 160° C.

REFERENCE EXAMPLE 8

The procedure of Reference Example 1 is repeated except that a copolymer is prepared from a monomer mixture of 15% of glycidyl methacrylate, 30% of methyl methacrylate, 40% of isobutyl methacrylate and 15% of vinyltoluene, using 3% of a catalyst (AIBN) and xylene as a solvent. The copolymer has a number average molecular weight of 6,000 and a melt viscosity of 150 poises at 160° C.

REFERENCE EXAMPLE 9

The procedure of Reference Example 1 is repeated except that a copolymer is prepared from a monomer mixture of 12% of glycidyl methacrylate, 50% of methyl methacrylate, 28% of styrene and 10% of 2-ethylhexyl acrylate, using 2% of a catalyst (AIBN) and toluene as a solvent for the copolymer. The copolymer obtained in the solvent has a number average molecular weight of 10,500 and a melt viscosity of 400 poises at 160° C.

REFERENCE EXAMPLE 10

The procedure of Reference Example 1 is repeated except that a copolymer is prepared from a monomer mixture of 22% of glycidyl methacrylate, 20% of n-hexyl methacrylate, 33% of styrene and 25% of butyl methacrylate, using 0.7% of lauroyl peroxide as a catalyst and xylene as a solvent to form the copolymer therein. The copolymer obtained in the solvent has a number average molecular weight of 20,000 and a melt viscosity of 245 poises at 160° C.

REFERENCE EXAMPLE 11

The procedure of Reference Example 1 is repeated except that 2-ethoxyethyl acetate copolymer is prepared from a monomer mixture of 8% of glycidyl methacrylate, 52% of methyl methacrylate and 40% of isobutyl methacrylate, using 7% of a catalyst (AIBN). The copolymer obtained in the solvent has a number average molecular weight of 2,500 and a melt viscosity of 180 poises at 160° C.

REFERENCE EXAMPLE 12

The procedure of Reference Example 1 is repeated except that a copolymer is prepared from a monomer mixture of 10% of glycidyl acrylate, 37% of methyl methacrylate, 30% of styrene and 23% of n-butyl methacrylate, using 4% of a catalyst (AIBN) and toluene as a solvent to form the copolymer therein. The copolymer has a number average molecular weight of 5,000 and a melt viscosity of 230 poises at 160° C.

REFERENCE EXAMPLE 13 (for comparison)

The procedure of Reference Example 1 is repeated except that a copolymer is prepared from a monomer mixture of 3% of glycidyl methacrylate, 70% of methyl methacrylate, 12% of styrene and 15% of ethylacrylate, using 3% of a catalyst (AIBN) and toluene as a solvent to form the copolymer therein. The copolymer has a number average molecular weight of 8,000 and a melt viscosity of 600 poises at 160° C.

REFERENCE EXAMPLE 14 (for comparison)

The procedure of Reference Example 1 is repeated except that a copolymer is prepared from a monomer mixture of 15% of glycidyl acrylate, 15% of methyl methacrylate, 20% of styrene, 10% of n-butyl methacrylate and 40% of 2-ethylhexyl acrylate, using 4% of a catalyst (AIBN) and toluene as a solvent to form the copolymer therein. The copolymer has a number average molecular weight of 6,000 and a melt viscosity of 80 poises at 160° C.

REFERENCE EXAMPLE 15 (for comparison)

The procedure of Reference Example 1 is repeated except that a copolymer is prepared from a monomer mixture of 30% of glycidyl methacrylate, 20% of methyl methacrylate, 30% of styrene and 20% of butyl acrylate, using 4% of a catalyst (AIBN) and toluene as a solvent to form the copolymer therein. The copolymer has a number average molecular weight of 6,000 and a melt viscosity of 100 poises at 160° C.

REFERENCE EXAMPLE 16 (for comparison)

The procedure of Reference Example 1 is repeated except that a copolymer is prepared from a monomer mixture of 15% of glycidyl methacrylate, 30% of methyl methacrylate, 40% of isobutyl methacrylate and 15% of vinyltoluene, using 10% of a catalyst (ABVN) and xylene as a solvent to form the copolymer therein. The copolymer has a number average molecular weight of 1,500 and a melt viscosity of 110 poises at 160° C.

REFERENCE EXAMPLE 17 (for comparison)

The procedure of Reference Example 1 is repeated except that a copolymer is prepared from a monomer mixture of 15% of glycidyl methacrylate, 30% of methyl methacrylate, 40% of isobutyl methacrylate and 15% of vinyltoluene, using 0.5% of a catalyst (AIBN) and benzene as a solvent to form the copolymer therein. The copolymer has a number average molecular weight of 40,000 and a melt viscosity of 630 poises at 160° C.

EXAMPLE 1

A 100 g portion of the copolymer solution prepared in Reference Example 1, 100 g of rutile-type titanium dioxide and 1 g of Modaflow (trade mark, leveling agent of Monsanto Chemical Co., U.S.A.) are placed into a 0.75-liter pebble mill and treated for 15 hours to prepare a dispersion, to which another 100 g portion of the copolymer solution is added. The mixture is thoroughly mixed to obtain a pigment dispersion, which is then charged into a container equipped with a thermometer, stirrer and pressure reducing means and is heated under atmospheric pressure until the temperature of the contents reaches 170° C, while permitting the solvent to escape through a concurrent condenser. While keeping the contents at a temperature of 170° C, the container is evacuated and maintained to distil off the solvent at a reduced pressure of 20 mm of mercury for 10 minutes. The solid mass obtained is then withdrawn which is found to contain 0.3% of volatiles. A 150 g quantity of the mass and 10 g of azelaic acid are placed into a heating kneader, kneaded at 80° to 100° C for 15 minutes, cooled and pulverized to obtain a coating composition in the form of fine particles passing through a 150 mesh screen. The powder coating composition is electrostatically applied to a 0.8 mm thick steet-panel surface-treated with iron phosphate to a film thickness of 50 to 60 $\mu$. The coated panel is tested to determine the properties of the film, with the results given in Table 4. The panel is baked at 200° C for 20 minutes. (In the following Examples and Comparison Examples, baking is conducted under the same conditions.).

EXAMPLES 2 TO 12 AND COMPARISON EXAMPLES 1 TO 7

In the same manner as in Example 1, pigment dispersions are prepared. The composition of each of the dispersions is listed in Table 1. Subsequently, the solvent is distilled off from the dispersion under the conditions shown in Table 2, which also indicates the volatile content of the solid mass obtained. Following a procedure similar to that of Example 1, the solid mass is formulated into a coating composition in the form of fine particles, using the specified amounts of curing agent and catalyst given in Table 3. The film formed from the composition is similarly tested with the results shown in Table 4.

EXAMPLE 13

A 1,000 kg portion of the copolymer solution prepared in Reference Example 1, 1,500 kg of rutile-type titanium dioxide and 15 kg of Modaflow are placed into a 7-kl pebble mill and treated for 15 hours to prepare a dispersion, to which another 2,000 kg portion of the same copolymer solution is added. The pigment dispersion obtained is charged into a 5-kl container equipped with a thermometer, stirrer and evacuating means and heated under atmospheric pressure until the temperature of the contents reaches 170° C to remove the solvent through a concurrent condenser. While further keeping the contents at 170° C, the container is evacuated and maintained to distil off the solvent at a reduced pressure of 20 mm of mercury for 55 minutes, whereby 2,990 kg of a solid mass is obtained which contains 0.35% of volatiles. In the same manner as in Example 1, the mass (2,990 kg) and 149.5 kg of azelaic acid are kneaded, cooled and then pulverized to prepare 3,100 kg of a coating composition in the form of fine particles. The film formed from the composition is similarly tested with the results given in Table 4.

COMPARISON EXAMPLE 8

A 4,000 kg quantity of the copolymer solution prepared in Reference Example 1 and 15 kg of Modaflow are placed into the same solvent removing apparatus as used in Example 13 and distilled to remove the solvent under the same conditions as in Example 13. The volatile content of the solid mass is 0.4%. The resulting solid resin (100 parts), 100 parts of rutile-type titanium dioxide and 10 parts of azelaic acid are kneaded at 80 to 100° C for 15 minutes in a heating kneader, then cooled and thereafter crushed to particles having a diameter of about 1 mm. The crushed mixture is then kneaded at 80° to 100° C at a feed rate of 500 kg/hr in Buss Ko-Kneader PR-14 (trade mark, kneader manufactured by Buss Ltd., Switzerland) to prepare a dispersion. The mass is pulverized into fine powder passing 150-mesh sieves to obtain a powder coating composition. The film formed from the composition is tested with the results given in Table 4.

COMPARISON EXAMPLE 9

A coating composition in the form of fine particles is prepared from 100 parts of the solid resin obtained in Comparison Example 8, 25 parts of rutile-type titanium dioxide, 10 parts of azelaic acid and 1 part of Modaflow in the same manner as in Comparison Example 8. The film formed from the composition is tested with the results given in Table 4.

Table 1

| Ex. No. | Copolymer solution | | Pigment | | Additional solvent | Leveling agent | Mill | Amount of copolymer solution additionally used |
|---|---|---|---|---|---|---|---|---|
| 2 | Ref.Ex. | 2 | Rutile-type titanium dioxide | 100 g | 50 g | — | Modaflow 1 g | Pebble mill | 100 g |
| 3 | " | 3 | " | " | " | — | " | " | " |
| 4 | " | 4 | " | " | 25 g | Xylene 20 g | " | " | " |
| 5 | " | 5 | " | " | 50 g | — | " | " | " |
| 6 | " | 6 | Phthalocyanine Blue | " | 7 g | — | Ester gum 1g Modaflow 1 g | " | " |
| 7 | " | 7 | Ultramarine | " | 10 g | Toluene 20 g | Modaflow 1 g | " | " |
| 8 | " | 8 | Red iron oxide | " | 10 g | — | Polylauryl acrylate 1 g | Steel ball mill | " |
| 9 | " | 9 | Molybdate orange | " | 10 g | — | " | " | " |
| 10 | Ref. Ex. | 10 | Carbon black | 100 g | 25 g | — | Polyethylhexyl acrylate 1 g | Steel ball mill | 100 g |
| 11 | " | 11 | Rutile-type titanium dioxide | " | 50 g | — | Modaflow 1 g | Pebble mill | " |
| 12 | " | 12 | " | " | 50 g | — | " | " | " |
| Comp. Ex. 1 | " | 13 | " | " | 50 g | — | " | " | " |
| Comp. Ex. 2 | " | 14 | " | " | 50 g | — | " | " | " |
| Comp. Ex. 3 | " | 15 | " | " | 50 g | — | " | " | " |
| Comp. Ex. 4 | " | 16 | " | " | 50 g | — | " | " | " |
| Comp. Ex. 5 | " | 17 | " | " | 50 g | Benzene 40 g | " | " | " |

Table 2

| Example No. | Max. temp. of dispersion (° C) | Degree of vacuum (mm Hg) | Volatiles* (%) |
|---|---|---|---|
| 2 | 170 | 20 | 0.2 |
| 3 | 170 | 20 | 0.3 |
| 4 | 200 | 20 | 0.4 |
| 5 | 170 | 20 | 0.3 |
| 6 | 175 | 20 | 0.2 |
| 7 | 175 | 20 | 0.3 |
| 8 | 180 | 20 | 0.3 |
| 9 | 170 | 20 | 0.3 |
| 10 | 190 | 20 | 0.2 |
| 11 | 210 | 20 | 0.2 |
| 12 | 180 | 20 | 0.3 |
| Comp.Ex. 1 | 170 | 20 | 0.3 |
| 2 | 170 | 20 | 0.3 |
| 3 | 170 | 20 | 0.2 |
| 4 | 170 | 20 | 0.3 |
| 5 | 170 | 20 | 0.3 |
| 6 | (dispersion of Ex. 1) 150 | 20 | 1.2 |
| 7 | (dispersion of Ex. 1) 240 | 20 | 0.9 |

Note: *A portion of the solid mass obtained is ground in a mortar into fine powder passing 100-mesh

Table 2-continued

| Example No. | Max. temp. of dispersion (°C) | Degree of vacuum (mm Hg) | Volatiles* (%) |
|---|---|---|---| sieves. About 1.5 g of powder is weighed out on a tinplate dish, 60 mm in diameter, dried at 110° C for 3 hours and thereater weighed.

Amount of volatiles (%) = $100 \times \frac{A-B}{A}$ in which A is the weight of the sample before drying and B is the weight of the sample after drying.

Table 3

| Example No. | Solid mass (g) | Cross-linking agent (g) | | Catalyst | (g) |
|---|---|---|---|---|---|
| 2 | 150 | Azelaic acid | 6 | Dibutyltin laurate | 0.2 |
| 3 | 150 | Sebacic acid | 10 | — | |
| 4 | 125 | " | 15 | — | |
| 5 | 150 | " | 15 | Triphenyltin chloride | 0.1 |
| 6 | 107 | Suberic acid | 9 | — | |
| 7 | 110 | Sebacic acid | 10.5 | Tetraethyl- ammonium bromide | 0.1 |
| 8 | 110 | Dodecanedioic acid | 13 | — | |
| 9 | 110 | " | 13 | — | |
| 10 | 102.5 | " | 16 | Trimethyl- benzyl- ammonium chloride | 0.1 |
| 11 | 150 | " | 7 | " | |
| 12 | 150 | " | 8 | " | |
| Comp.Ex. | | | | | |
| 1 | 150 | Azelaic acid | 2 | " | |
| 2 | 150 | " | 10 | — | |
| 3 | 150 | " | 20 | — | |
| 4 | 150 | " | 10 | — | |
| 5 | 150 | " | 10 | — | |
| 6 | 150 | " | 10 | — | |
| 7 | 150 | " | 10 | — | |

Table 4

| Example No. | Anti- blocking property of coating comp. | Gloss (60°) of coating | Surface smoothness (wave length × wave height) | Erichsen test (mm) | Impact resistance (500 g . ½ inch) | Solvent resistance |
|---|---|---|---|---|---|---|
| 1 | No change | 98 | 2.0 mm × 0.6 mm | >7 | 50 cm | No change |
| 2 | " | 96 | 1.2 mm × 0.5 mm | " | " | " |
| 3 | " | 97 | 2.0 mm × 0.5 mm | " | " | " |
| 4 | " | 97 | 1.3 mm × 0.5 mm | " | " | " |
| 5 | " | 93 | 1.6 mm × 0.6 mm | " | " | " |
| 6 | " | 98 | 1.2 mm × 0.6 mm | " | " | " |
| 7 | " | 97 | 2.0 mm × 0.7 mm | " | " | " |
| 8 | " | 95 | 1.8 mm × 0.6 mm | " | " | " |
| 9 | " | 97 | 2.1 mm × 0.7 mm | " | " | " |
| 10 | " | 99 | 1.8 mm × 0.7 mm | " | " | " |
| 11 | " | 96 | 1.1 mm × 0.5 mm | " | " | " |
| 12 | " | 97 | 1.6 mm × 0.7 mm | " | " | " |
| 13 | No change | 97 | 2.1 mm × 0.6 mm | >7 | 50 cm | No change |
| Comp.Ex. | | | | | | |
| 1 | " | 97 | 2.2 mm × 0.8 mm | 1.5 | 25 cm | Markedly oxidized |
| 2 | Fused to blocks | 96 | 1.7 mm × 0.6 mm | >7 | 50 cm | No change |
| 3 | No change | 65 | 2.8 mm × 1.7 mm | " | " | " |
| 4 | " | 95 | 1.7 mm × 0.6 mm | 3 | 40 cm | " |
| 5 | " | 70 | 3.5 mm × 1.9 mm | >7 | 50 cm | " |
| 6 | Fused to blocks | 97 | 2.0 mm × 0.6 mm | " | " | " |
| 7 | " | 95 | 2.7 mm × 1.3 mm | " | " | " |
| 8 | No change | 15 | 10.1 mm × 5.5 mm | " | " | " |
| 9 | " | 85 | 2.7 mm × 1.2 mm | " | " | " |

Properties of the powder coating composition and coating film are determined in accordance with the following methods;

1. Anti-blocking property: The powder coating composition is subjected to a load of 30 g/cm$^2$ while being maintained at 40 ± 0.5° C for 120 hours and is thereafter inspected.

2. Gloss of film: JIS K-5400 6.7.

3. Surface smoothness: Determined by Profilometer, "Model SE-3" (product of Kosaka Laboratory Ltd., Japan).

4. Erichsen test: The coated plate is placed in a constant temperature and humidity chamber kept at 20° C and a humidity of 75% for 1 hour. Thereafter, the plate is set on Erichsen testing machine with the coating positioned outside. A punch having a radius of 10 mm is pushed outward predetermined distances in contact with the rear face of the plate at as uniform speed as possible of about 0.1 mm/sec. The pushed out portion of the plate is checked by the naked eye for cracking or peeling immediately after pushing out to determine the maximum distance (mm) of stroke of the punch causing no changes on the coating.

5. Impact resistance: After leaving a coated plate to stand in a constant temperature and constant humidity chamber at a temperature of 20 ± 1° C and a humidity of 75% for 1 hour, the following test is conducted in the same chamber. A bearer and a center of impact of prescribed sizes are fitted to a Du Pont impact tester and the plate is put between them, turning the coated surface of the plate upward. The prescribed weight is dropped on the center of impact from the prescribed height and the plate is taken out, and after having been left for an hour in the room, the damage of surface is observed. The largest height (cm) of the weight entailing no cracking in the coating is determined.

6. Solvent resistance: The coated plate is immersed in xylene at 20° C for 48 hours, then allowed to stand in an atmosphere at 20° C and 75% RH for 2 hours and thereafter inspected for the degree of softening of the film. When found free of softening, the film is evaluated as "no change".

The test results reveal the following:

1. Molecular weight

Use of a copolymer having a number average molecular weight Mn of less than 2,000, even with its melt viscosity in the range of 100 to 500 poises at 160° C, gives a coating composition having a poor antiblocking property, whilst the film formed therefrom exhibits unsatisfactory properties (Comparison Example 6).

With Mn in excess of 30,000, the copolymer has a high melt viscosity, yielding films which are unacceptable in gloss and smoothness and are therefore unfit for surface finishing (Comparison Example 5).

2. Amount of glycidyl methacrylate or glycidyl acrylate

Insufficient amounts result in poor curability, giving films which are poor in properties including solvent resistance (Comparison Example 1), whereas excess amounts permit premature curing and prevent satisfactory flow of the composition, giving poor surface gloss and smoothness unfit for surface finishing (Comparison Example 3).

3. Solvent removing temperature

Low in Comparison Example 1, and high in Comparison Example 7. Presumably, thermal decomposition of the copolymer concurrently occurs in the latter case, with the result that the composition has an increased volatile content and exhibits poor anti-blocking property.

4. Dispersing method

At a high pigment concentration, the pigment displays very low dispersibility when kneaded with a solid copolymer, resulting in seriously reduced surface smoothness and gloss (Comparison Example 8). Even when the pigment is used at a greatly reduced concentration, kneading of solid ingredients fails to produce a film which is as glossy and smooth as those provided by the present process (Comparison Example 9).

The process of this invention takes 15 hours for dispersing the pigment, 1 hour for removal of the solvent and 15 minutes for kneading the curing agent with the copolymer mixture. The operation on a 3-ton scale achieves a yield of about 200 kg/hr which, although seemingly lower than the yield of about 400 kg/hr attained by the conventional extruder system, can be easily increased to 5 to 10 times as by employing a ball mill of a greater capacity as the dispersing means. The pigment dispersing operation, which can be conducted by a pebble mill, entails very low labor and running costs.

In contrast, the solvent removing step of the conventional method and kneading step of solid ingredients require considerably high labor and running costs which almost amount to the entire manufacturing cost of coating composition.

Whereas the invention requires about 75 minutes for carrying out the above-mentioned procedure by a 3-ton scale operation, the conventional process takes 7 hours (420 minutes) which is about 6 time as much as the former. This evidences the great advantage of the invention.

What we claim is:

1. A process for preparing a thermosetting powder coating composition comprising the steps of copolymerizing 5 to 25 wt.% of at least one member selected from the group consisting of glycidyl acrylate and glycidyl methacrylate with 95 to 75 wt.% of an ethylenically unsaturated compound in a solvent having a boiling point of up to 170° C to obtain a solution of copolymer, the copolymer having a number average molecular weight of 2,000 to 30,000 and a melt viscosity of 100 to 500 poises at 160° C, uniformly dispersing a pigment into the copolymer solution, removing the solvent from the resulting mixture at a temperature of 170° to 220° C and reduced pressure not to exceed 0.5 wt.% of residual solvent, thereafter admixing a di- or tri-carboxylic acid cross-linking agent with the mixture with heating at a temperature of up to 120° C, and pulverizing the solid mixture obtained.

2. The process for preparing a thermosetting powder coating composition according to claim 1, in which at least one of said glycidyl acrylate and glycidyl methacrylate, and said ethylenically unsaturated compound are used in an amount of 10 to 23 wt.% and 90 to 77 wt.% respectively, in the step of copolymerization.

3. The process for preparing a thermosetting powder coating composition according to claim 1, in which the step of copolymerization is conducted in a solvent having a boiling point of 70° to 160° C.

4. The process for preparing a thermosetting powder coating composition according to claim 1, in which said copolymer has a number average molecular weight of 2,500 to 20,000.

5. The process for preparing a thermosetting powder coating composition according to claim 1, in which said copolymer has a melt viscosity of 100 to 400 poises at 160° C.

6. The process for preparing a thermosetting powder coating composition according to claim 1, in which at least one of leveling agent and antistatic agent is used in the step of uniformly admixing the pigment with the copolymer solution.

7. The process for preparing a thermosetting powder coating composition according to claim 1, in which the step of removing the solvent from the mixture is conducted at 175° to 210° C.

8. The process for preparing a thermosetting powder coating composition according to claim 1, in which the step of removing the solvent from the mixture is conducted under the reduced pressure of less than about 70 mm Hg.

9. The process for preparing a thermosetting powder coating composition according to claim 8, in which said reduced pressure is less than about 40 mm Hg.

10. The process for preparing a thermosetting powder coating composition according to claim 1, in which said di- or tri-carboxylic acid cross-linking agent is used in such amount that the molar ratio of the glycidyl groups in the copolymer to the carboxyl groups in the cross-linking agent is 1.6 to 0.8 in the step of admixing the cross-linking agent with the mixture.

11. The process for preparing a thermosetting powder coating composition according to claim 10, in which said molar ratio is 1.2 to 0.9.

12. The process for preparing a thermosetting powder coating composition according to claim 1, in which the step of admixing the di- or tri-carboxylic acid cross-linking agent with the mixture is conducted at a temperature of 70° to 110° C.

13. The process for preparing a thermosetting powder coating composition according to claim 1, in which a catalyst is further used in the step of admixing the di- or tri-carboxylic acid cross-linking agent with the mixture.

14. A process according to claim 1 wherein said ethylenically unsaturated compound is selected from the group consisting of methyl methacrylate, ethyl methacrylate, butyl methacrylate, methyl acrylate, ethyl acrylate, butyl acrylate, 2-ethylhexyl acrylate, 2-hydroxyethyl methacrylate, 2-hydroxypropyl methacrylate, 2-hydroxypropyl acrylate, lauryl methacrylate, cyclohexyl methacrylate and cyclohexyl acrylate.

15. A process for preparing a thermosetting powder coating composition comprising the steps of copolymerizing 5 to 25 wt.% of at least one member selected from the group consisting of glycidyl acrylate and glycidyl methacrylate with 95 to 75 wt.% of at least one of ethylenically unsaturated compound selected from the group consisting of acrylates and methacrylates represented by the formula

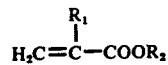

wherein $R_1$ is hydrogen atom or $-CH_3$ and $R_2$ is alkyl having a carbon number of 1 to 12, cyclohexyl or

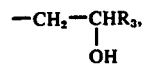

$R_3$ being hydrogen atom or $-CH_3$, styrene, α-methylstyrene, vinyltoluene, methacrylonitrile and acrylonitrile in a solvent having a boiling point of 70 to 170° C to obtain a solution of copolymer, the copolymer having a number average molecular weight of 2,000 to 30,000 and a melt viscosity of 100 to 500 poises at 160° c, uniformly dispersing a pigment into the copolymer solution, removing the solvent from the resulting mixture at a temperature of 170 to 220° C and reduced pressure not to exceed 0.5 wt.% of residual solvent, thereafter admixing a di- or tri-carboxylic acid cross-linking agent with the mixture with heating at a temperature of up to 120° C, and pulverizing the solid mixture obtained.

* * * * *